(12) United States Patent
Weber

(10) Patent No.: US 8,220,885 B2
(45) Date of Patent: Jul. 17, 2012

(54) FASTENING DEVICE FOR FURNITURE PARTS

(75) Inventor: Heimo Weber, Gundelfingen (DE)

(73) Assignee: Anton Schneider GmbH & Co. KG, Kenzingen (DE)

( * ) Notice: Subject to any disclaimer, the term of this patent is extended or adjusted under 35 U.S.C. 154(b) by 535 days.

(21) Appl. No.: 12/290,655

(22) Filed: Oct. 31, 2008

(65) Prior Publication Data

US 2009/0113673 A1 May 7, 2009

(30) Foreign Application Priority Data

Nov. 2, 2007 (DE) .................... 20 2007 015 212 U

(51) Int. Cl.
*A47B 88/00* (2006.01)
(52) U.S. Cl. .................................. 312/348.4; 312/348.2
(58) Field of Classification Search ............... 312/330.1, 312/348.1, 348.2, 348.4, 319.1; 403/321, 403/322.1, 322.4, 325–327, 330, DIG. 10, 403/DIG. 12, DIG. 13; 292/194, 195, 202, 292/219, 220, 228, DIG. 37, DIG. 63
See application file for complete search history.

(56) References Cited

U.S. PATENT DOCUMENTS

| | | | |
|---|---|---|---|
| 691,050 A * | 1/1902 | Dronne | 403/327 |
| 983,647 A * | 2/1911 | Romine | 292/111 |
| 1,755,392 A * | 4/1930 | Hagstrom et al. | 292/99 |
| 1,934,105 A * | 11/1933 | Totty | 292/128 |
| 2,517,059 A * | 8/1950 | Van Every | 292/99 |
| 2,553,835 A * | 5/1951 | Sachs | 403/327 |
| 2,712,151 A * | 7/1955 | Becht | 220/759 |
| 2,714,751 A * | 8/1955 | Stuart et al. | 52/582.2 |
| 2,789,852 A * | 4/1957 | Eads | 292/110 |
| 2,874,388 A | 2/1959 | Edelen, Sr. | |
| 2,901,277 A * | 8/1959 | Anderson | 292/78 |
| 3,565,469 A * | 2/1971 | Zwart | 52/582.2 |
| 3,604,364 A * | 9/1971 | Sweger | 410/70 |
| RE27,276 E * | 1/1972 | Erikson | 292/113 |
| 3,774,551 A * | 11/1973 | Sweger | 410/70 |
| 3,933,402 A * | 1/1976 | Peterson | 312/265.1 |
| 4,367,971 A * | 1/1983 | Coren | 403/330 |
| 4,417,430 A * | 11/1983 | Loikitz | 52/582.2 |
| 4,422,794 A * | 12/1983 | Deken | 403/330 |
| 4,502,807 A * | 3/1985 | Salice | 403/11 |
| 4,507,010 A * | 3/1985 | Fujiya | 403/322.1 |
| 4,582,446 A * | 4/1986 | Salice | 403/215 |
| 4,655,489 A * | 4/1987 | Bisbing | 292/110 |
| 4,687,237 A * | 8/1987 | Bisbing | 292/78 |

(Continued)

FOREIGN PATENT DOCUMENTS

AT         399261         4/1995

(Continued)

*Primary Examiner* — Darnell Jayne
*Assistant Examiner* — Kimberly S Wright
(74) *Attorney, Agent, or Firm* — Lucas & Mercanti, LLP; Klaus P. Stoffel

(57) ABSTRACT

A fastening device for furniture parts includes a two-arm lever having a front lever arm and a rear lever arm mounted on a first furniture part so as to be pivotable about an axis of rotation. The front lever arm has for engagement in a holder of a second furniture part comprised of a transverse plate supported by a spacer member, wherein the transverse plate is approximately hook-shaped and is provided with an inclined contact surface located in front of the transverse plate. The spring-biased lever is mounted so as to be longitudinally displaceable to a limited extent and the front lever arm has an additional indentation for resting the lever arm on a fixed transverse axis.

7 Claims, 2 Drawing Sheets

U.S. PATENT DOCUMENTS

| | | | |
|---|---|---|---|
| 4,705,328 A | | 11/1987 | Rock et al. |
| 4,752,150 A | * | 6/1988 | Salice .......................... 403/330 |
| 4,826,345 A | * | 5/1989 | Salice .......................... 403/231 |
| 4,846,538 A | | 7/1989 | Rock et al. |
| 4,850,659 A | * | 7/1989 | Rock et al. ................... 312/263 |
| 4,930,931 A | * | 6/1990 | Matsui ......................... 403/231 |
| 5,040,858 A | | 8/1991 | Kruse et al. |
| 5,222,791 A | | 6/1993 | Held et al. |
| 5,281,022 A | * | 1/1994 | Rock .......................... 312/348.4 |
| 5,364,181 A | * | 11/1994 | Scheible ................... 312/348.4 |
| 5,375,923 A | * | 12/1994 | Hall et al. ................. 312/348.4 |
| 5,460,443 A | * | 10/1995 | Ferrari et al. .............. 312/348.4 |
| 5,493,759 A | * | 2/1996 | Salice ............................ 16/238 |
| 5,518,282 A | * | 5/1996 | Sawada ........................ 292/252 |
| 5,540,515 A | * | 7/1996 | Rock et al. ................. 403/322.4 |
| 5,611,637 A | * | 3/1997 | Brustle et al. ................ 403/297 |
| 5,613,814 A | * | 3/1997 | Jackson .......................... 410/70 |
| 5,641,240 A | * | 6/1997 | Grieser et al. ................ 403/403 |
| 5,664,857 A | * | 9/1997 | Lautenschlager et al. . 312/348.4 |
| 5,860,718 A | * | 1/1999 | Brustle ....................... 312/348.2 |
| 6,027,194 A | * | 2/2000 | Fleisch ....................... 312/348.4 |
| 6,048,001 A | * | 4/2000 | Miller et al. .................. 292/198 |
| 6,109,667 A | * | 8/2000 | Collins ........................... 292/78 |
| 6,203,077 B1 | * | 3/2001 | Schlack ........................ 292/203 |
| 6,250,694 B1 | * | 6/2001 | Weiland ....................... 292/110 |
| 6,286,919 B1 | * | 9/2001 | Fleisch ....................... 312/348.4 |
| 6,457,791 B1 | * | 10/2002 | Muterthies et al. ........ 312/348.4 |
| 6,719,337 B1 | * | 4/2004 | Ji .............................. 292/341.17 |
| 6,981,752 B2 | * | 1/2006 | Harn et al. ................. 312/348.4 |
| 7,032,973 B2 | * | 4/2006 | Reubeuze ................ 297/378.13 |
| 7,540,577 B2 | * | 6/2009 | Netzer ....................... 312/348.4 |
| 7,670,157 B2 | * | 3/2010 | Miyamoto .................... 439/157 |
| 2004/0000849 A1 | * | 1/2004 | Harn et al. ................. 312/330.1 |
| 2004/0208692 A1 | * | 10/2004 | Anthony et al. .............. 403/327 |
| 2004/0226139 A1 | * | 11/2004 | Salice ............................ 16/286 |
| 2010/0102692 A1 | * | 4/2010 | Hammerle ................ 312/348.4 |

FOREIGN PATENT DOCUMENTS

| | | |
|---|---|---|
| DE | 70 47 932 | 5/1971 |
| DE | 43 32 152 | 3/1995 |
| DE | 299 14 388 | 12/1999 |
| EP | 96/28995 | 9/1996 |
| EP | 0 740 917 | 11/1996 |
| GB | 2255369 | 4/1992 |
| SU | 1800960 | 3/1993 |

* cited by examiner

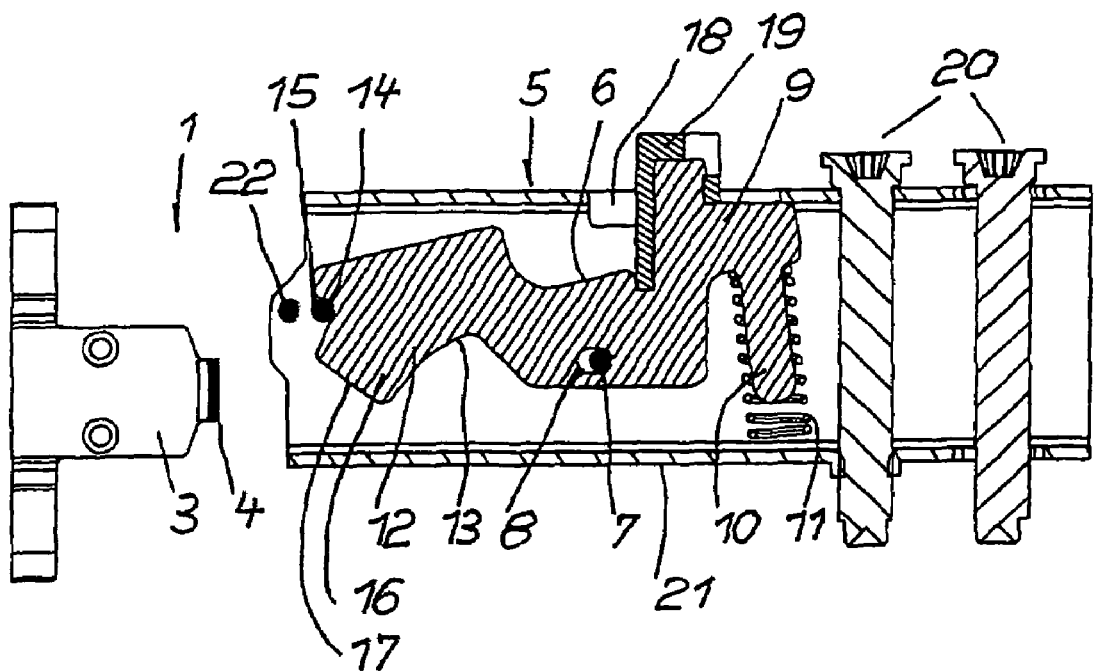
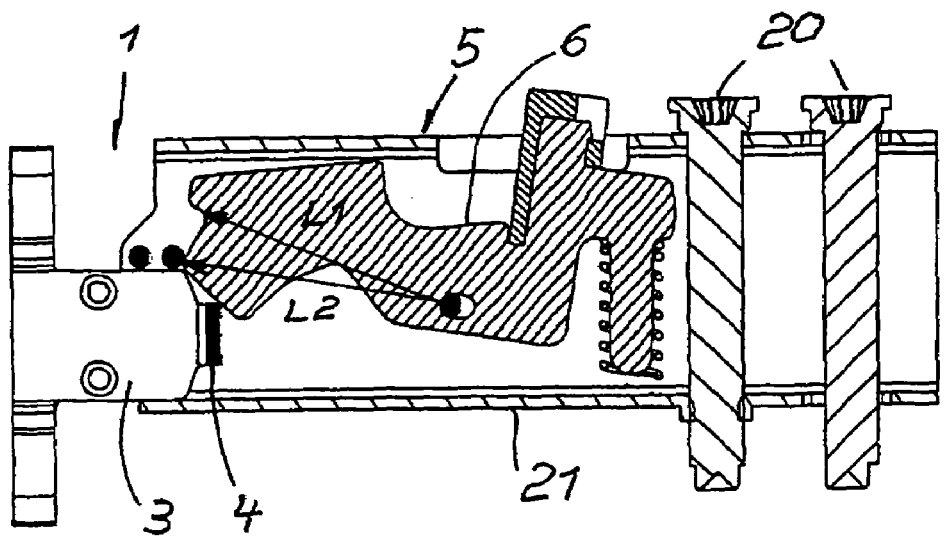

FASTENING DEVICE FOR FURNITURE PARTS

BACKGROUND OF THE INVENTION

1. Field of the Invention

The present invention relates to a fastening device for furniture parts.

2. Description of the Related Art

For fastening front cover plates to drawers it is already known, for example, to insert the front cover plate with a holder in double-wall drawer frames or in receiving devices arranged in the drawers, wherein locking is effected by means of a spring-biased lever. Of course, this locking connection must be so strong that the connection between the front cover plate and the drawer remains rigid when the drawer is pulled out in a normal manner. On the other hand, it is desired to make it possible that the front cover plate can be easily removed, either when it is damaged, when it must be cleaned or is to be provided with a different color. The same problem also occurs in connections between other furniture parts.

SUMMARY OF THE INVENTION

In a fastening device for furniture parts which includes a two-arm lever and is pivotable about an axis of rotation, wherein the front lever arm of the two-arm lever is constructed for engagement in a holder of another furniture part, wherein the holder is comprised of a transverse plate supported by a spacer member, is constructed approximately in the shape of a hook, and has an inclined contact surface located in front of the transverse plate, the lever which is spring-biased for engagement in the holder is supported so as to be longitudinally displaceable to a limited extent and the front lever arm includes an additional indentation for the final placement on a fixed transverse axis.

When the holder is pushed toward the lever, the transverse plate of the lever makes contact with the inclined contact surface of the front lever arm and pushes the latter upwardly, wherein simultaneously the lever is pushed in the pushing direction of the holder. Following the inclined contact surface, the transverse plate also slides into the hook part of the front lever arm and the latter then pivots back in its initial position in the direction for placement on the transverse axis, wherein the lever is once again pushed forwardly by the spring. By supporting the lever on the transverse axis, a self-locking action of the lever relative to an opening movement is ensured, so that a secure connection is guaranteed. For separating the parts, a pressure is applied to the rear lever arm against the spring force and the front lever arm is once again raised and the holder and the furniture part connected to the holder can be removed. This results, on the one hand, in a fixed connection and, on the other hand, in a simple possibility of separating the connection.

For obtaining a limited longitudinal mobility of the lever, the lever is supported with an oblong hole on its axis of rotation. The oblong hole is preferably dimensioned in such a way that, when the indentation of the front lever arm rests along the transverse axis, the axis of rotation rests on the rearward end of the oblong hole and on the front end of the oblong hole when the holder is inserted. The transverse axis can be utilized in two ways, namely for supporting the lever arm, on the one hand, and as an additional guidance for the holder, on the other hand.

In accordance with another feature of the invention, the spring constructed as a compression spring is arranged on a projection extending approximately perpendicular to the rear lever arm. Preferably, the rear lever arm is accessible through an upper recess in order to facilitate an intended separation of the other furniture part.

The front lever arm preferably has following its indentation for the transverse axis an approximately rectangular, obliquely directed projection with the inclined contact surface for the holder, which is then followed by the hook-like indentation. The parts are advantageously constructed in such a way that the front lever arm is quickly pivoted upwardly when the holder is inserted and the oblong hole is pressed rearwardly toward the axis of rotation. In this connection, the distance between the axis of rotation and the transverse axis is greater than the distance between the indentation and the transverse axis. In the engaged position of the holder, this results in a line of action between the support of the front lever arm on the holder and the transverse axis which exerts a torque in the closing direction for self-locking of the lever in order to protect against the unintentional separation.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 1 is a cross-sectional view of the front part of a double-wall lateral drawer frame of a front cover, not shown, arranged in front of the frame prior to assembly;

FIG. 2 is an illustration, similar to FIG. 1, with an attached holder;

DETAILED DESCRIPTION OF THE INVENTION

Figure 3:
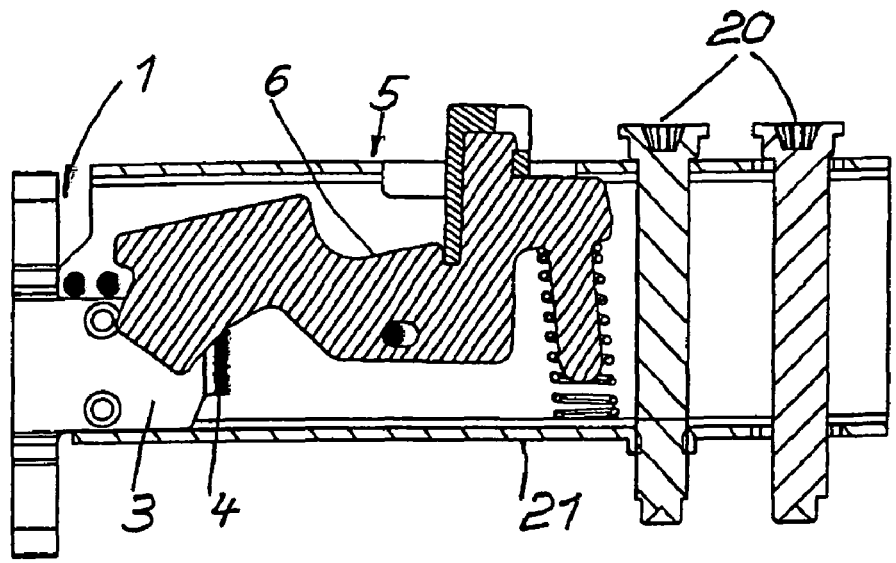
FIG. 3 is an illustration, similar to FIG. 1, shown in an intermediate position.

As illustrated in the drawing, a holder 1 has fastening means for a front cover, not shown, to which is attached a spacer member 3 with a transverse plate 4.

A two-arm lever 6 is pivotably mounted about an axis of rotation 7 in a lateral drawer frame 5 of a drawer, not shown. The lever 6 for the axis of rotation 7 is provided with an oblong hole 8, so that it is mounted so as to be movable to a limited extent. The rear lever arm 9 of the lever has a projection 10 which extends approximately perpendicular to the lever arm and serves for supporting a compression spring 11. The front lever arm 12 is provided with a hook-shaped recess 13 and also has an indentation 14, wherein, in the position of rest, according to FIG. 1, the front lever arm 12 rests with its hook-shaped recess 13 and with an indentation 14 on a transverse axis 15. Followed is this indentation 14 by an approximately rectangular obliquely downwardly directed projection 16 with an inclined contact surface 17 for the transverse plate 4 of the holder 1.

Moreover, the rear lever arm 9 is provided with a head 19 which protrudes upwardly through a recess 18 of the lateral frame in order to be able to pivot the head 19 upwardly through a recess 18 of the lateral frame 5 in order to be able to pivot the holder 1 intentionally against the pressure of the spring 11. The two adjusting screws 20 serve, in a manner which is not described in details, to adjust the transverse and vertical position of the front cover.

When the holder 1 is inserted, the holder 1 is pushed toward the lever 6 in the lateral frame 5. For guiding the lever 6, the bottom edge 21 of the side frame 5, the transverse axis 15 and a second transverse axis 22 are used. As shown in FIG. 2, the transverse plate 4 rests against the inclined contact surface 17 and upwardly pivots the lever 6 in a clockwise direction and rearwardly pushes the lever simultaneously up to the stop of the axis of rotation 7 in the oblong hole 8. The distance L2 is greater than the distance L1. After overcoming the inclined contact service 17, the transverse plate 4 slides into the hook-shaped recess 13, as shown in FIG. 3, so that the lever 6 is once again pivoted back by the spring force 11 and the axis of rotation 7 is displaced forwardly in the oblong hole 8.

Figure 4:
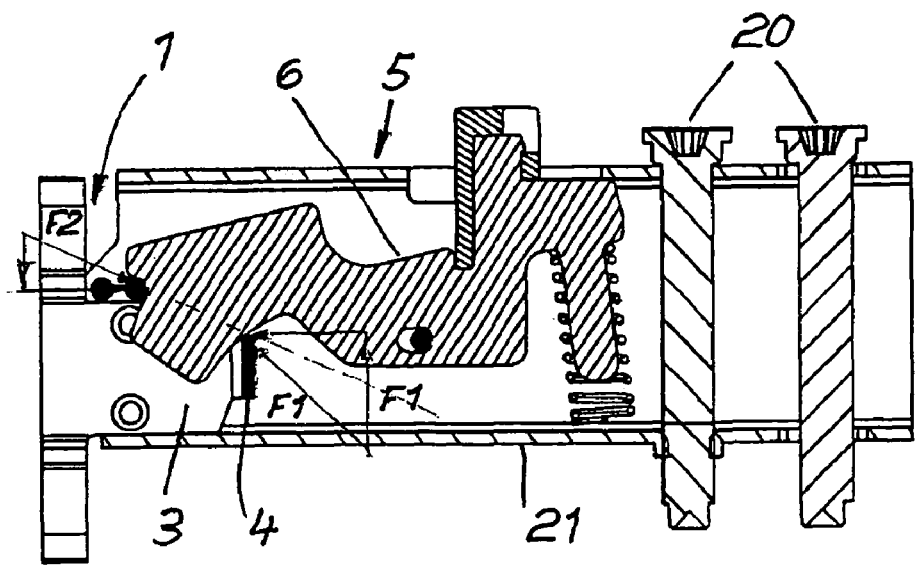
FIG. 4 is an illustration, similar to FIG. 1, with a fixedly mounted holder.

In the end position according to FIG. 4, the lever 6 once again assumes its initial position. In this connection, the holder 1 is locked in the side frame 5, wherein a self-locking action is achieved against an opening movement by pulling on the front plate, not shown, and on the holder 1 as a result. The opening force F1 of the holder 1 produces a counterforce F2 which extends through the transverse axis 15. In this regard, the direction of the line of action of F2 results in a torque which rotates the lever 6 in the closing direction and, thus, the self-locking action. For an intentional pulling of the holder 1, only the head 19 of the rear lever arm 9 has to be pressed through the opening 18 downwardly against the force of the spring 11. This then causes the transverse plate 4 to be released and the holder can be removed.

While specific embodiments of the invention have been shown and described in detail to illustrate the inventive principles, it will be understood that the invention may be embodied otherwise without departing from such principles.

I claim:

1. Fastening device for furniture parts, comprising a two-arm lever having a front lever arm and a rear lever arm mounted on a first furniture part so as to be pivotable about an axis of rotation, wherein, for engagement in a holder of a second furniture part comprised of a transverse plate supported by a spacer member, the front lever arm is approximately hook-shaped, has a first indentation for receiving the transverse plate in an engaged position of the holder and is provided with an inclined contact surface located in front of the transverse plate, wherein the first furniture part has a fixed transverse axis configured to act as an additional guide means for the holder, wherein the two-arm lever is biased by a spring and mounted so as to be longitudinally displaceable to a limited extent and the front lever arm has a front side with a second indentation for resting the front lever arm on a the fixed transverse axis of the first furniture part when the two-arm lever is in a position for engagement with the holder, wherein the lever is mounted on the axis of rotation thereof with an oblong hole, and wherein, when the holder is inserted, the front lever arm is pivoted upwardly and the oblong hole is pressed rearwardly against the axis of rotation, wherein the distance between the axis of rotation and the fixed transverse axis is greater than the distance between the second indentation and the axis of rotation.

2. The fastening device according to claim 1, wherein the first furniture part is a drawer and the second furniture part is a front cover.

3. The fastening device according to claim 1, wherein the oblong hole is dimensioned such that, when the second indentation of the front lever arm rests on the transverse axis, the axis of rotation rests on a rearward end of the oblong hole and on a forward end of the oblong hole when the holder is inserted.

4. The fastening device according to claim 1, wherein the spring is a compression spring and is arranged on a projection extending approximately perpendicularly to the rear lever arm.

5. The fastening device according to claim 1, wherein the rear lever arm is accessible through a recess at an upper side of the frame.

6. The fastening device according to claim 1, wherein the front lever arm has an approximately obliquely downwardly directed projection adjacent to the second indentation, wherein the projection is provided with the inclined contact surface and followed by the first indentation at an opposite side.

7. The fastening device according to claim 1, wherein, in the engaged position of the holder, a line of operation exists between a contact point of the forward lever arm on the holder and the transverse axis, wherein a torque results in the closing direction for a self-looking action of the lever against undesired separation.

* * * * *